United States Patent
Layland et al.

(10) Patent No.: US 9,567,089 B2
(45) Date of Patent: Feb. 14, 2017

(54) HYBRID HINGE AND LATCH BEAM

(71) Applicant: Rohr, Inc., Chula Vista, CA (US)

(72) Inventors: Michael J. Layland, Bonita, CA (US);
Norman J. James, San Diego, CA (US); David Forsey, Poway, CA (US);
Christian Soria, La Mesa, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 13/949,963

(22) Filed: Jul. 24, 2013

(65) Prior Publication Data

US 2014/0027602 A1   Jan. 30, 2014

Related U.S. Application Data

(60) Provisional application No. 61/675,277, filed on Jul. 24, 2012.

(51) Int. Cl.
| | | |
|---|---|---|
| *F16M 13/00* | (2006.01) | |
| *F16M 1/00* | (2006.01) | |
| *B64D 27/26* | (2006.01) | |
| *B64D 29/06* | (2006.01) | |

(52) U.S. Cl.
CPC ............... *B64D 27/26* (2013.01); *B64D 29/06* (2013.01)

(58) Field of Classification Search
CPC .......... B64D 29/00; B64D 29/08; B64D 29/06
USPC ....................... 60/226.2, 226.3, 230; 248/200
See application file for complete search history.

(56) References Cited

U.S. PATENT DOCUMENTS

| | | | | | |
|---|---|---|---|---|---|
| 4,585,189 | A | * | 4/1986 | Buxton | ............................ 244/54 |
| 4,697,763 | A | * | 10/1987 | Vermilye | .................... 244/129.4 |
| 5,350,136 | A | * | 9/1994 | Prosser | .................. B64D 29/08 |
| | | | | | 244/118.2 |
| 5,372,338 | A | * | 12/1994 | Carlin | .................... B64D 29/08 |
| | | | | | 244/129.4 |
| 6,340,135 | B1 | * | 1/2002 | Barton | ........................ 244/53 B |
| 8,627,644 | B2 | * | 1/2014 | Vauchel | ........................ 60/226.2 |
| 8,899,917 | B2 | * | 12/2014 | Bajusz et al. | ................. 415/144 |
| 2008/0016844 | A1 | * | 1/2008 | Shutrump | ..................... 60/226.1 |
| 2014/0145060 | A1 | * | 5/2014 | Le Boulicaut | ................ 248/554 |

* cited by examiner

*Primary Examiner* — Amy Sterling
(74) *Attorney, Agent, or Firm* — O'Shea Getz P.C.

(57) ABSTRACT

A hybrid beam for support of a nacelle panel of a jet engine is disclosed. The beam is comprised of a first longitudinal composite panel and a second longitudinal composite panel, wherein the first longitudinal composite panel is integrally affixed to the second longitudinal composite panel along a longitudinal edge. The composite panels form a composite beam structure that is substantially open with a cross-section that is generally "L-shaped". A plurality of hinge stations are affixed to a first side of the first longitudinal composite panel and at least one track guide is disposed on a second side of the first longitudinal composite panel. The track guides receive a head portion of a slider that is fixed to the translating jet engine nacelle panel. Each hinge station further comprises a bushing for defining a center of rotation for the jet engine nacelle panel relative to the beam.

6 Claims, 16 Drawing Sheets

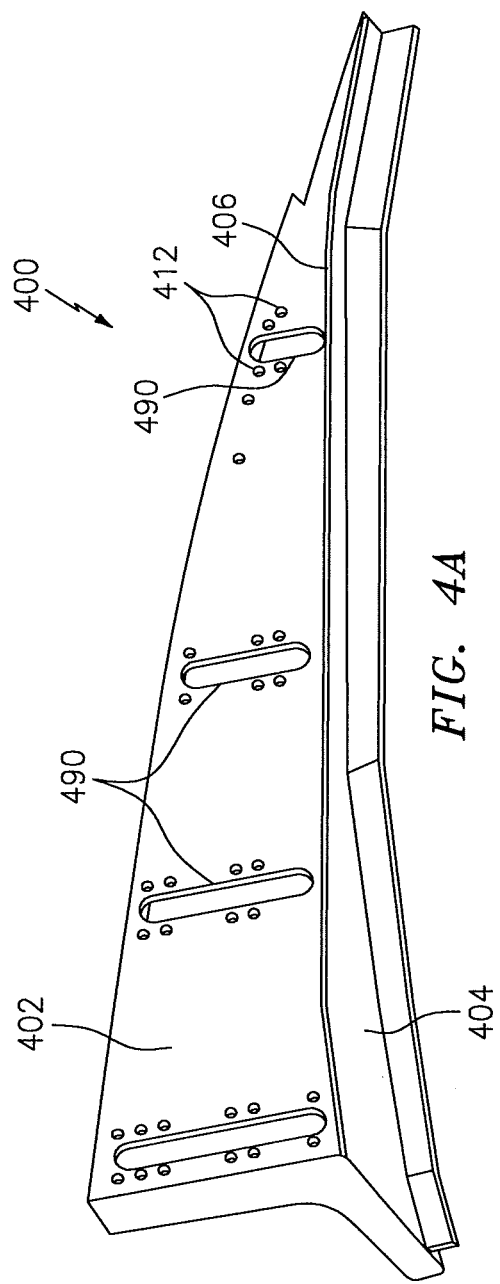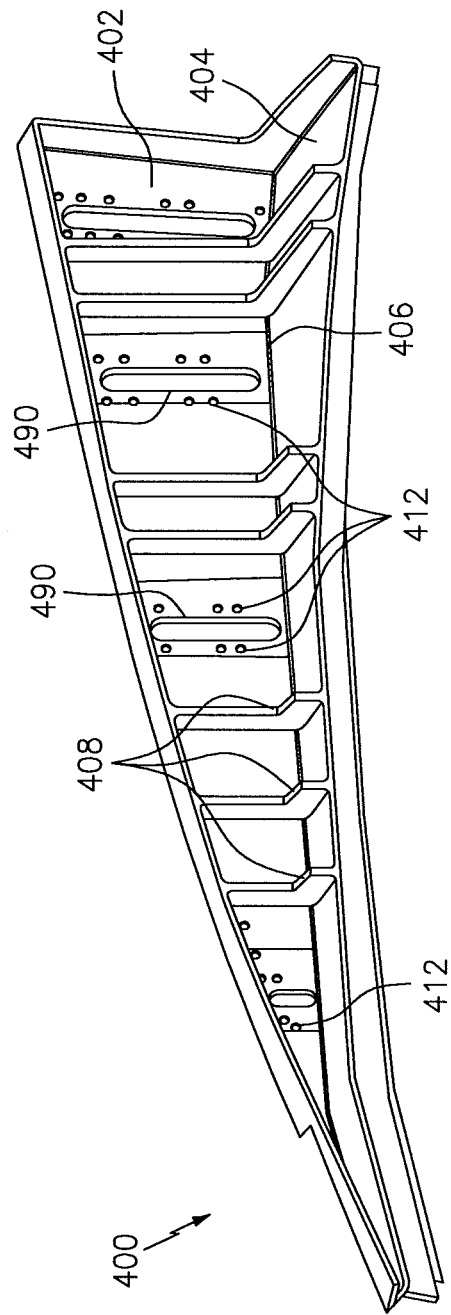
FIG. 4A
FIG. 4B

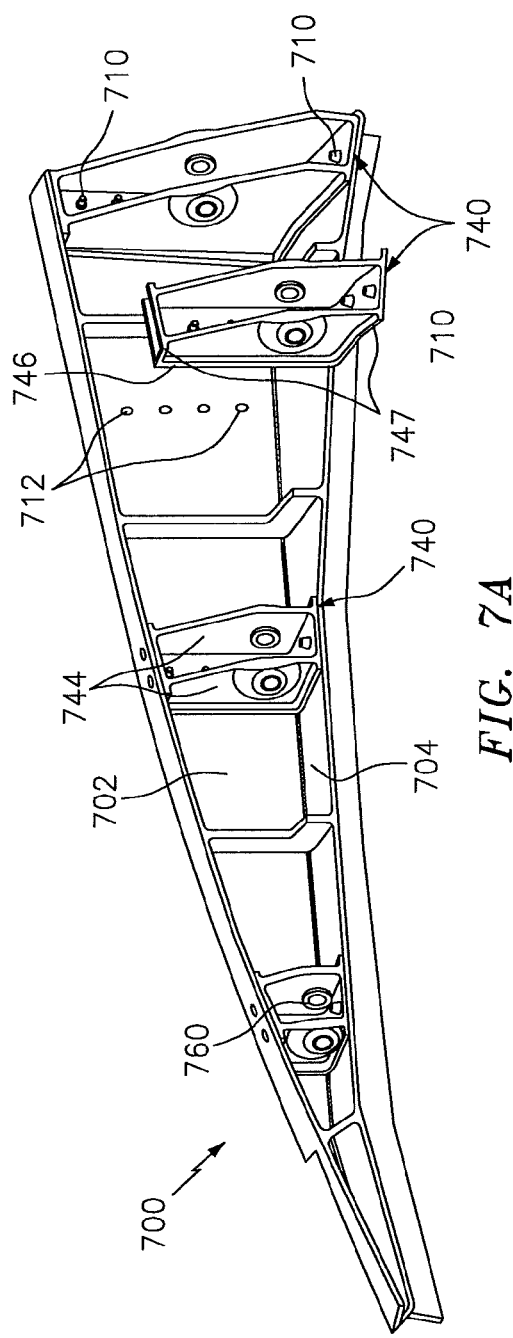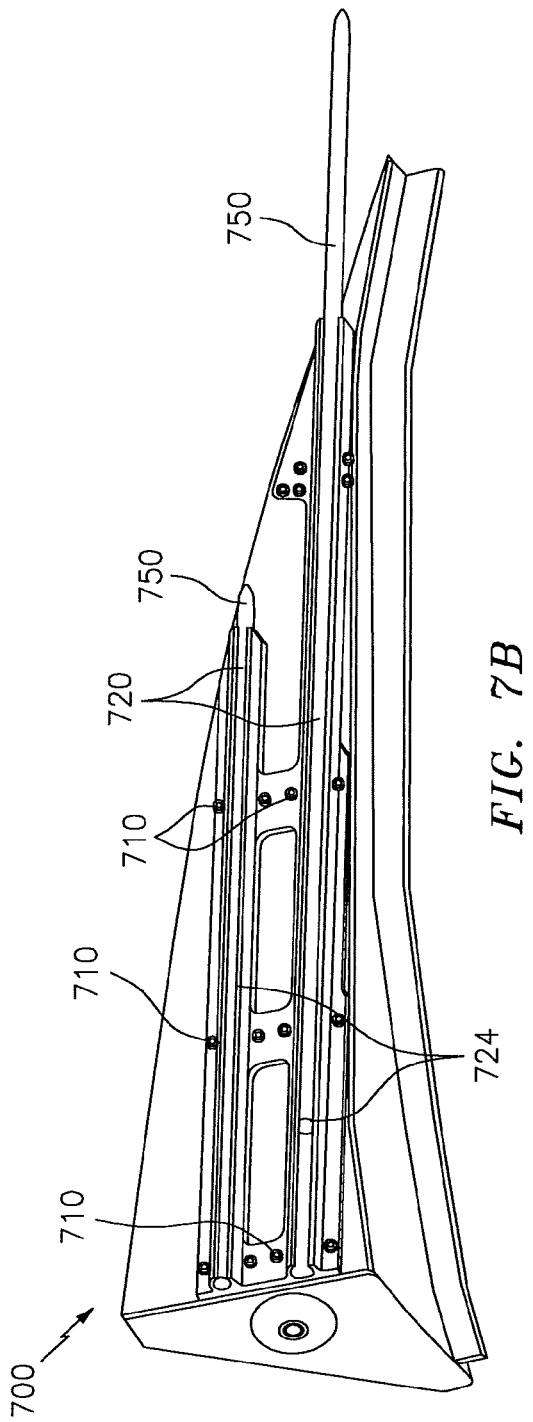
FIG. 7A
FIG. 7B

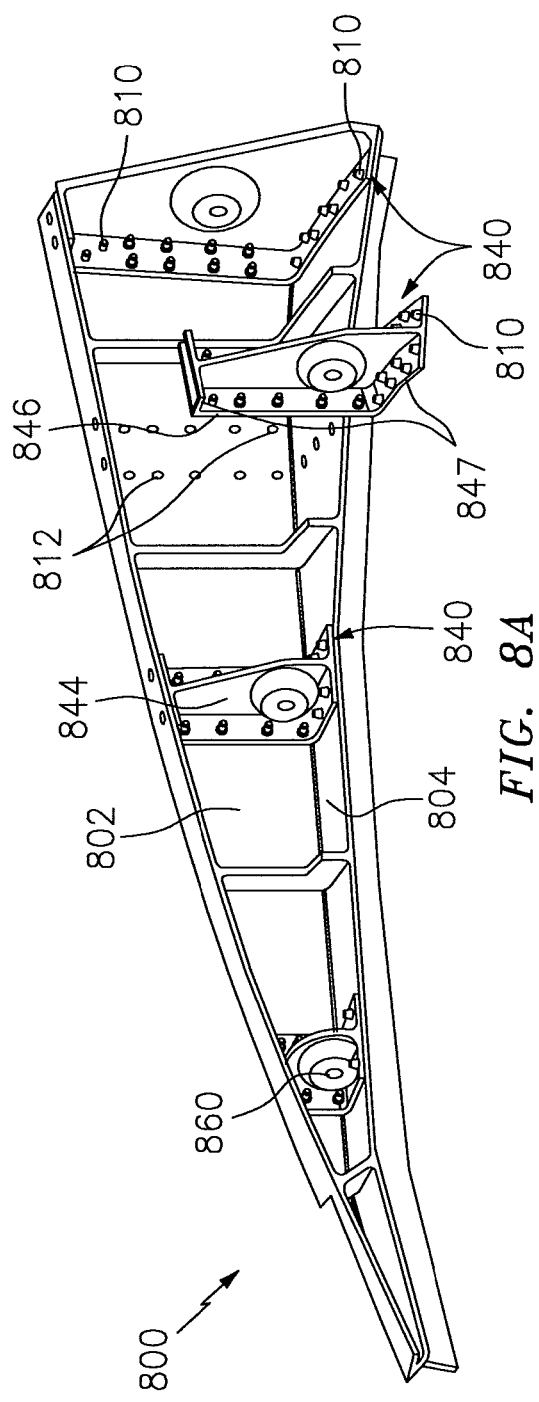

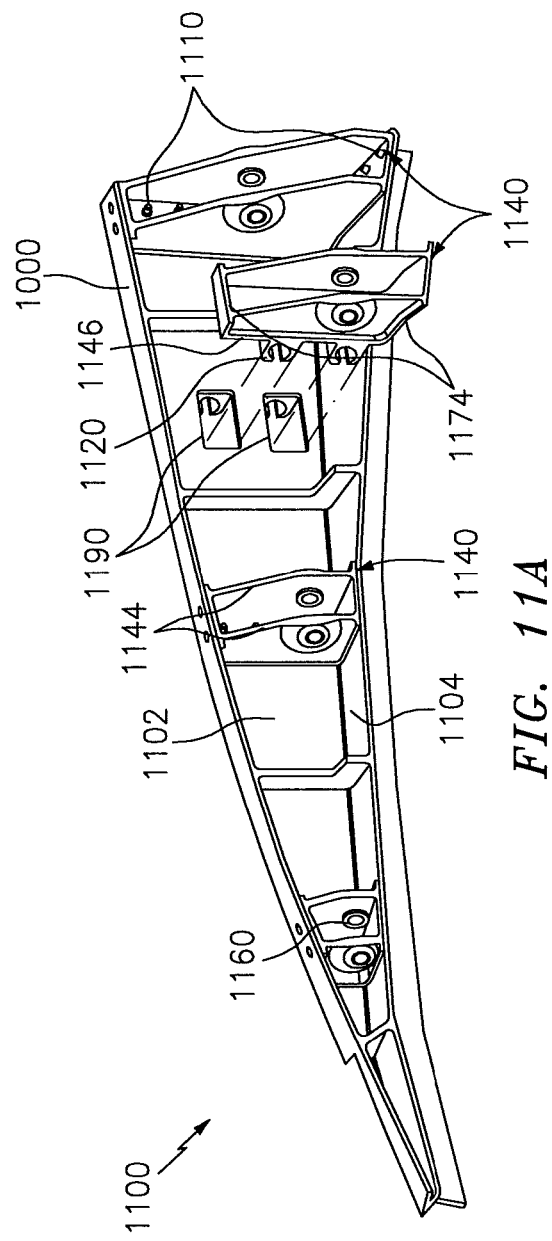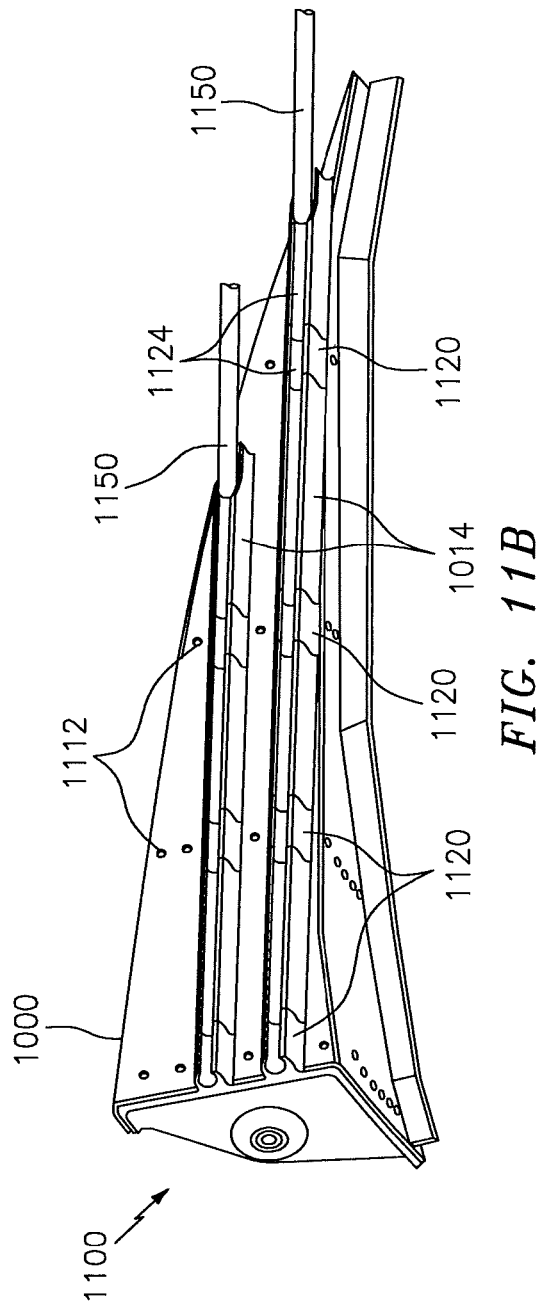
FIG. 11A
FIG. 11B

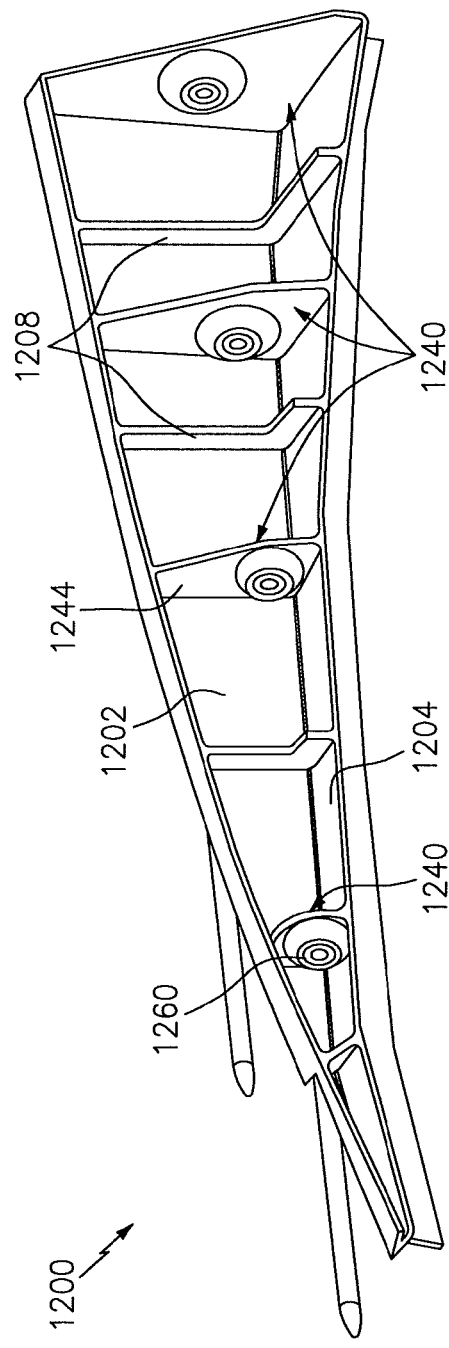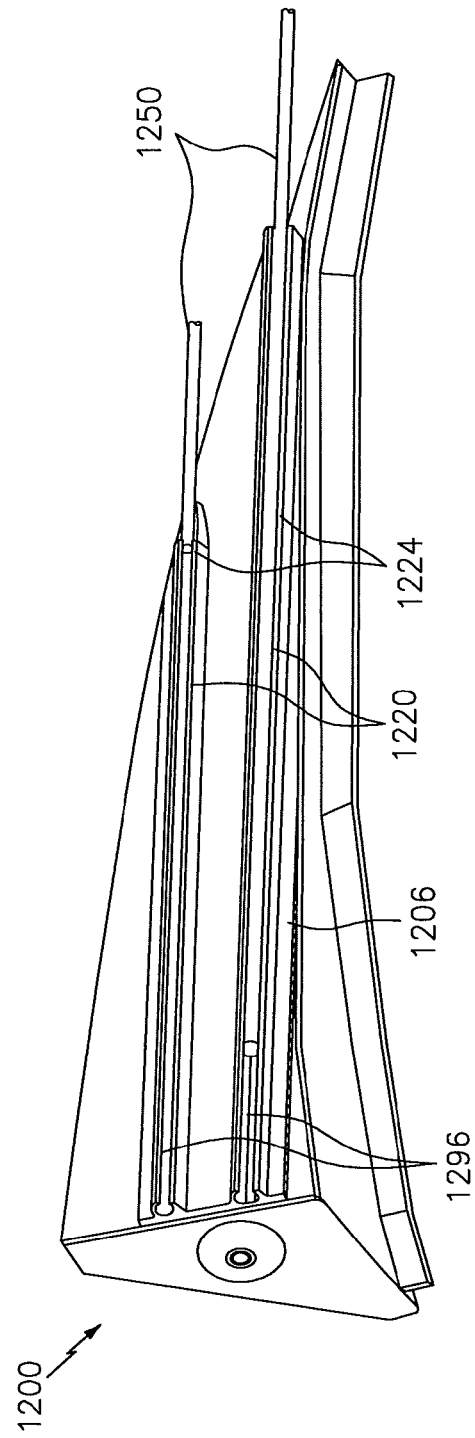
FIG. 12A
FIG. 12B

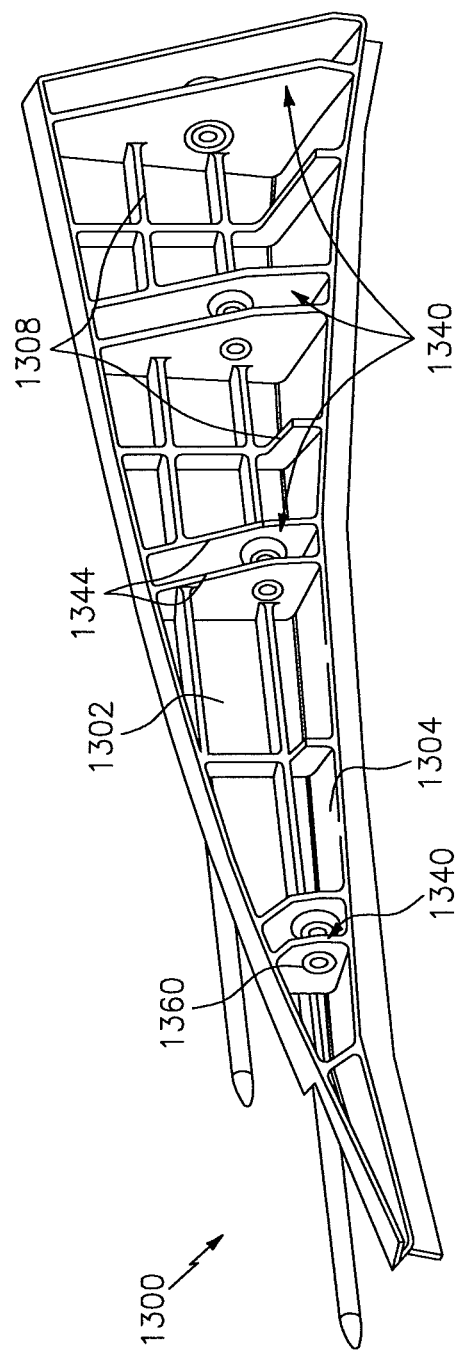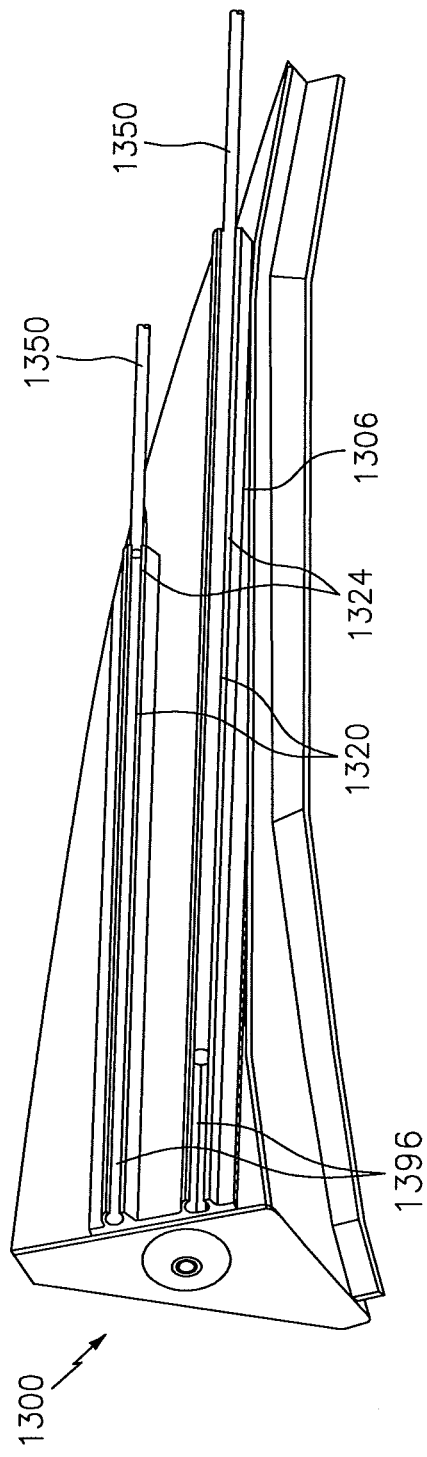
FIG. 13A
FIG. 13B

HYBRID HINGE AND LATCH BEAM

This application claims priority to U.S. Patent Appln. No. 61/675,277 filed Jul. 24, 2012.

BACKGROUND

Nacelle structures for jet engines of an aircraft provide a housing within which the jet engine is supported. The nacelle structure typically includes a thrust reverser that can provide assistance in slowing the aircraft by redirecting the engine thrust. The thrust reverser includes a panel of the nacelle that is translated between a stowed position, for normal operation during flight, and a deployed position, for redirecting the engine thrust, such as during landing of the aircraft. The thrust reverser panel slides along a track beam to move between the stowed position and the deployed position.

Thrust reverser track beams support the thrust reverser panel during translation and join the thrust reverser panels and an engine strut or pylon for under-wing carriage of the nacelle. Other installations of jet engines may enclose the engine within a fuselage portion of the aircraft, in which case the beams join the thrust reverser panels to the aircraft fuselage.

Thrust reverser track beams have conventionally been machined from solid ingots of metal, such as aluminum. As engine diameters and bypass ratios have increased, the engine weight has increased commensurately. This has required larger and stronger beams. The increasing size of the beams requires larger aluminum ingots resulting in greater waste aluminum during manufacturing. More recently, composite track beams have been proposed, in which the generally closed-form beam is constructed from a composite material, such as graphite fiber layers impregnated with a resin material to form a graphite composite structure. Other constructions may involve a tubular hybrid beam, in which a portion of the beam is composite and a portion is metal. Although such beam constructions provide reduced weight, composite and hybrid composite beams are encumbered with difficult manufacturing techniques and poor access to critical components. Such beams can also be more difficult to inspect, due to the substantially closed construction of the composite portions of the beam.

Therefore, beams of reduced weight and improved manufacturability with ease of access are desired for use with panels of jet engine nacelle structures.

SUMMARY

A hybrid beam for support of a nacelle panel of a jet engine is disclosed. The beam is comprised of a first longitudinal composite panel and a second longitudinal composite panel, wherein the first longitudinal composite panel is integrally affixed to the second longitudinal composite panel along a longitudinal edge. The composite panels form a composite beam structure that is substantially open with a cross-section that is generally "L-shaped". A plurality of hinge stations are affixed to a first side of the first longitudinal composite panel and at least one track guide is disposed on a second side of the first longitudinal composite panel. The track guides receive a head portion of a slider that is fixed to the translating jet engine nacelle panel. Each hinge station further comprises a bushing for defining a center of rotation for the jet engine nacelle panel relative to the beam. The longitudinal composite panels of the beam comprise a composite material and may employ one or more reinforcement ribs in a longitudinal direction, transverse direction, or both directions.

Additional details of construction may be applied in accordance with particular operational requirements. For example, the reinforcement ribs of the composite beam can be optimized to handle the particular loads associated with a given application and may be constructed of a composite or other material. Similarly, the hinge stations can be constructed with one or more hinge plates depending upon the requirements of the application and may be constructed of metal, or may be of a composite material. The track guides disposed on the composite beam may be continuous or discontinuous and may be constructed from a hybrid composite incorporating a metallic liner or may be constructed of metal only. A track guide insert may be disposed within the track guides to minimize friction and provide a replaceable wear surface for the slider.

Other features and advantages of the present invention should be apparent from the following description of the preferred embodiments, which illustrate, by way of example, the principles of the invention.

BRIEF DESCRIPTION OF THE DRAWINGS

FIGS. 4A and 4B show perspective opposing side views of a composite beam in accordance with the embodiments disclosed herein.

FIGS. 7A and 7B show perspective opposing side views of a hybrid beam constructed with hinge stations in accordance with the embodiments disclosed herein.

FIGS. 8A and 8B show perspective opposing side views of a hybrid beam constructed with hinge stations in accordance with the embodiments disclosed herein.

FIGS. 11A and 11B show perspective opposing side views of a hybrid beam constructed with hinge stations in accordance with the embodiments disclosed herein.

FIGS. 12A and 12B show perspective opposing side views of a hybrid beam constructed with hinge stations in accordance with the embodiments disclosed herein.

FIGS. 13A and 13B show perspective opposing side views of a hybrid beam constructed with hinge stations in accordance with the embodiments disclosed herein.

DETAILED DESCRIPTION

In the following description, various embodiments will be described. For purposes of explanation, specific configurations and details are set forth in order to provide a thorough understanding of the embodiments. It will also be apparent to one skilled in the art that the present invention can be practiced without the specific details described herein. Furthermore, well-known features may be omitted or simplified in order not to obscure the embodiment being described.

Figure 1A:
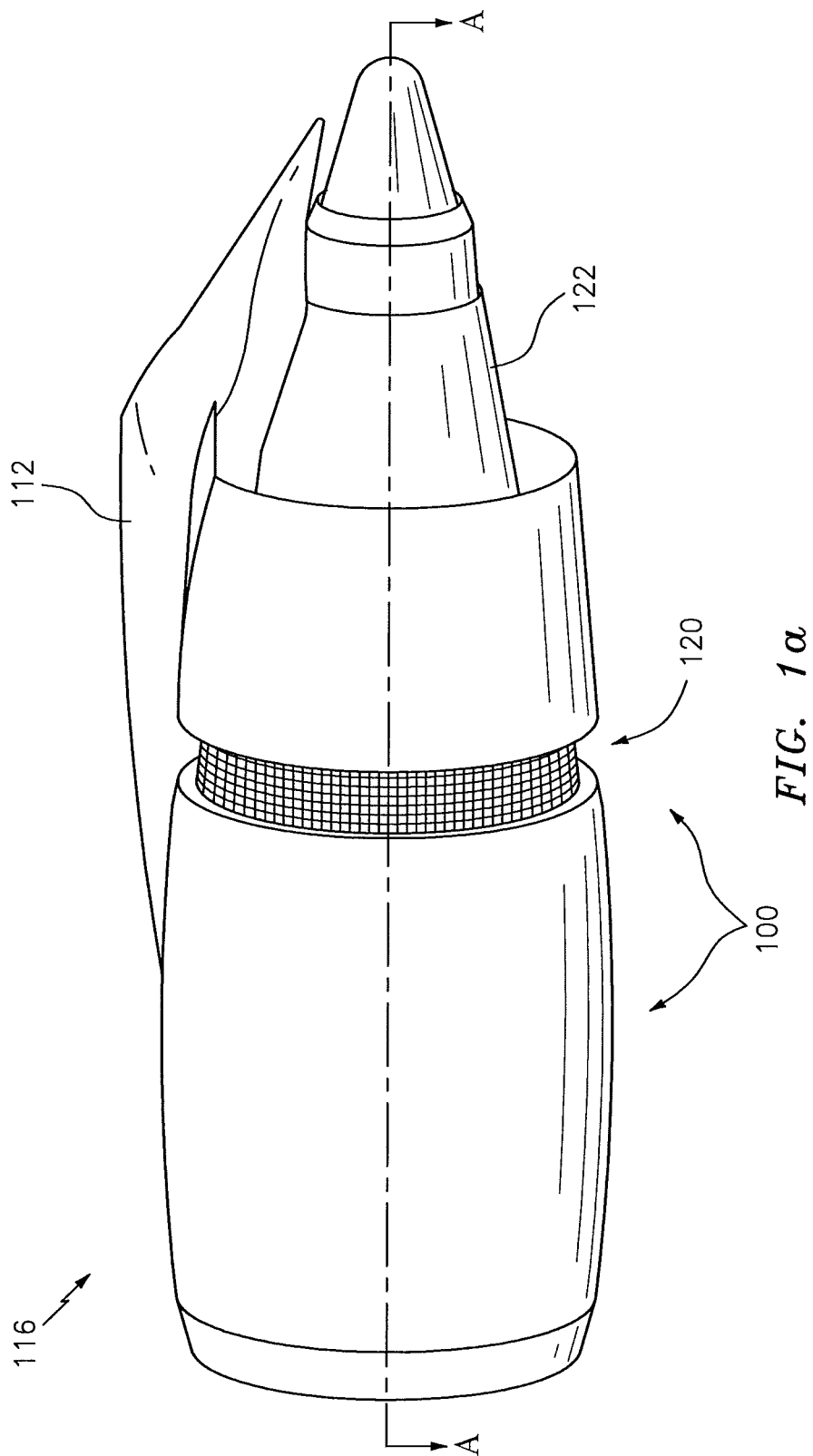
FIG. 1a is a perspective view of a turbofan jet engine nacelle that includes a thrust reverser with a hybrid beam in accordance with the embodiments disclosed herein.
Figure 1B:
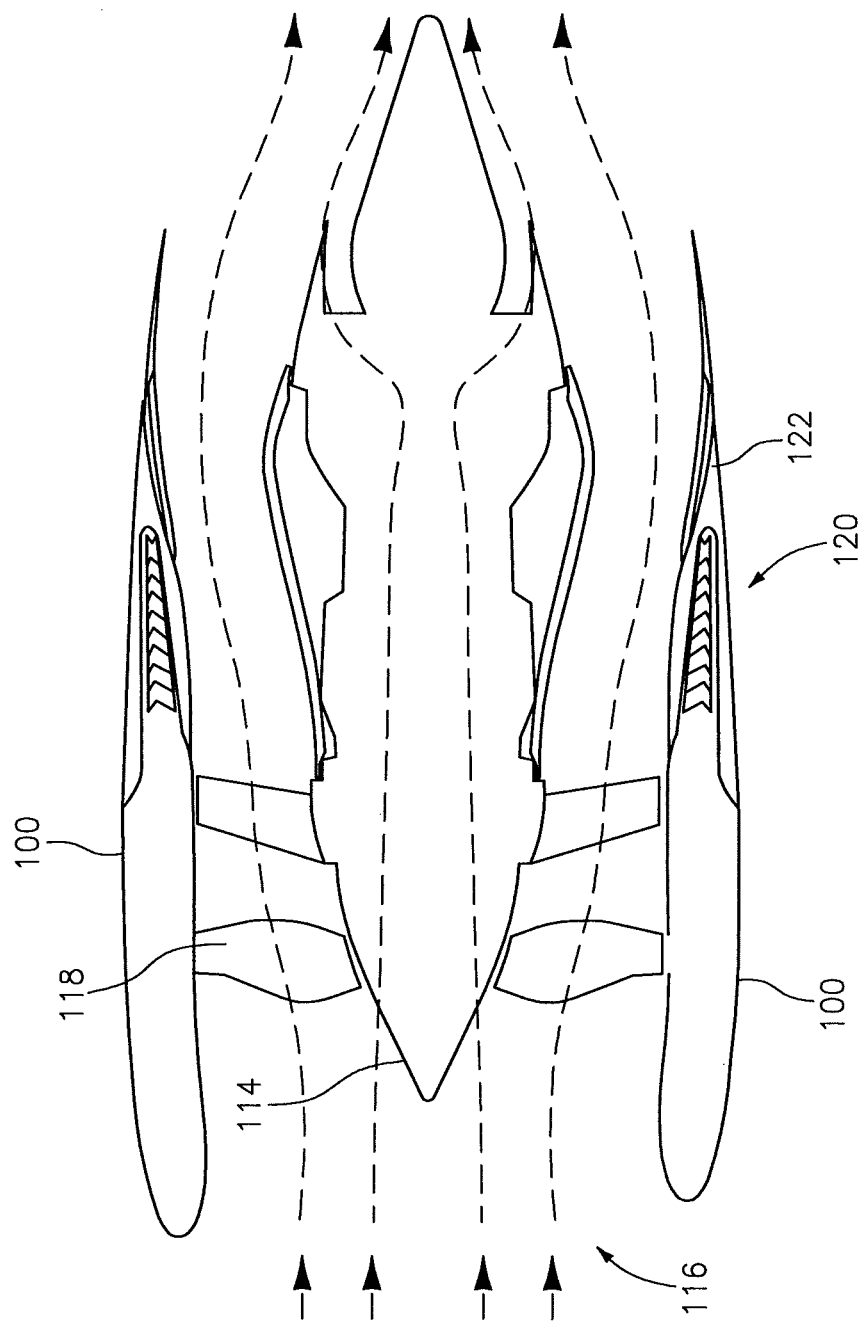
FIG. 1b is cross-section view of the turbofan jet engine and nacelle in FIG. 1a that includes a thrust reverser with a hybrid beam in accordance with the embodiments disclosed herein.

FIG. 1a is a perspective view of a turbofan jet engine 114 (FIG. 1b) enclosed within a nacelle 100 that includes a thrust reverser system with a hybrid beam in accordance with embodiments described herein. FIG. 1a depicts the thrust reverser in the deployed condition. FIG. 1b depicts a cross-section of the engine and nacelle with the thrust reverser in the stowed condition. The engine is supported from a wing of an aircraft by pylon structure 112. An inlet portion 116 of the engine nacelle 100 is located at a forward end of the nacelle, toward the left in FIG. 1a, and channels air to the engine 114 (FIG. 1b). A fan portion 118 of the inlet comprises a portion in which turbine fan blades compress the incoming air stream. A thrust reverser portion 120 at the aft end of the nacelle 100 comprises a portion where a thrust reverser may be deployed to help slow the aircraft upon landing. A thrust reverser panel 122 slides along a path defined by one or more beams within the nacelle in a manner known to those skilled in the art. When the thrust reverser panel is deployed, it causes thrust from the jet engine to be diverted so that aircraft speed is reduced.

Figure 2:
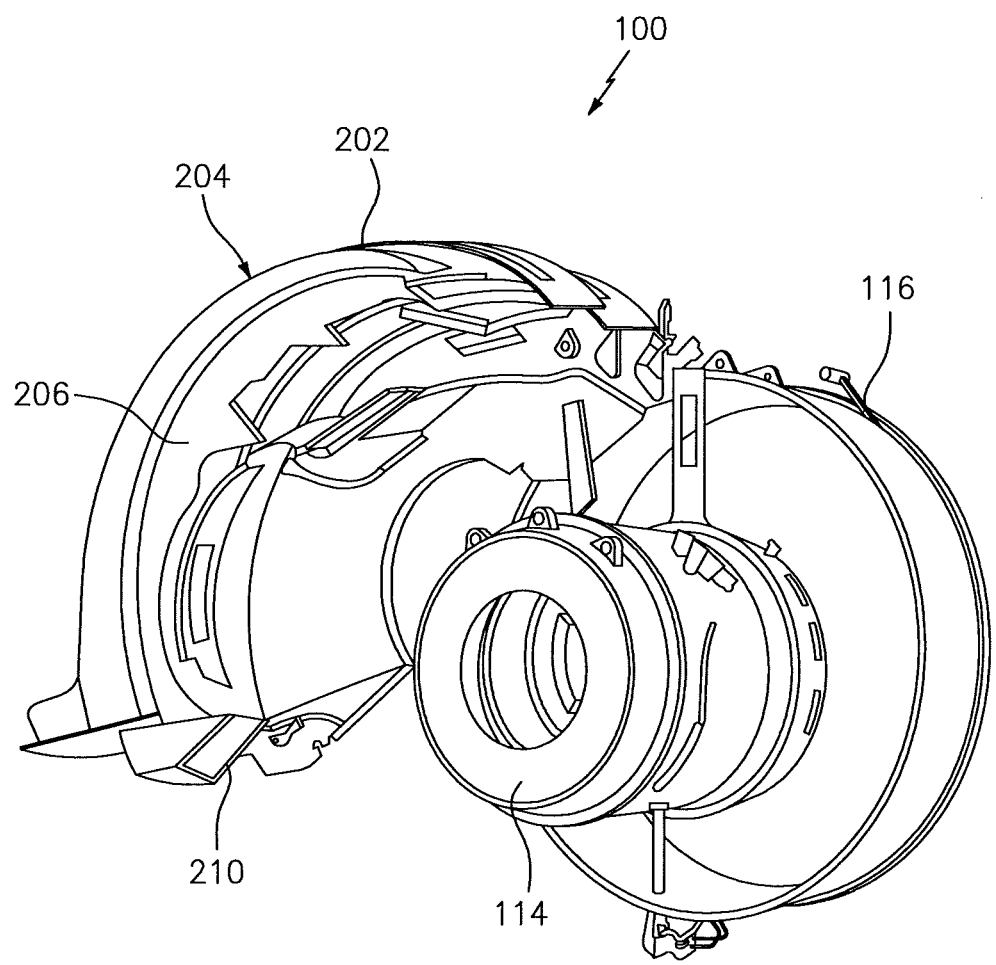
FIG. 2 is a perspective view of the turbofan engine in FIG. 1a from the aft end looking forward, with a left-side half of the nacelle in a raised position and the right-side half removed.

FIG. 2 is a perspective view of the turbofan jet engine 114 and nacelle 100 in FIG. 1 from the aft end looking forward, with a left-side half 202 of the nacelle in a raised position and the right-side half removed. The nacelle includes a curved outer surface 204 and a complementary inner curved surface 206. The nacelle is closed during flight, forming a structural panel that resists structural loads and contributes to aerodynamic qualities of the aircraft (see, e.g., FIG. 1b). Sensors of fire detection systems 210 are mounted on the inner surface 206 of the nacelle. The nacelle panel 202 and a thrust reverser panel 122 (see FIG. 1a) are supported by beams constructed in accordance with embodiments described herein.

Figure 3:
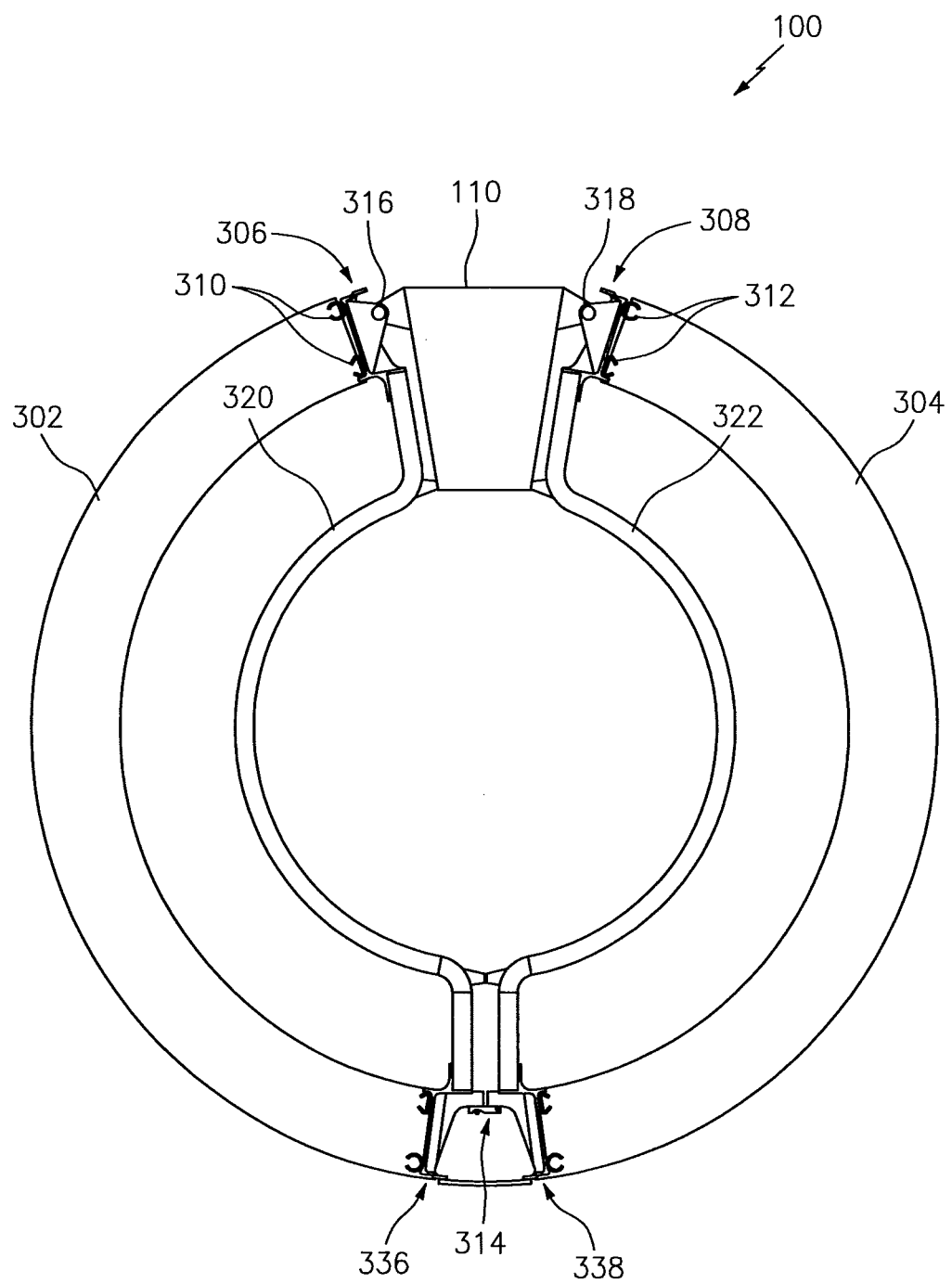
FIG. 3 is a cross-section view of the engine nacelle of FIG. 1a showing the location of beams in accordance with the embodiments disclosed herein.

FIG. 3 is a cross-section view of the engine nacelle of FIG. 1a showing the location of hybrid beams 306, 308 in accordance with the embodiments disclosed herein. FIG. 3 shows the nacelle 100 from the aft end looking forward, and illustrates that the nacelle is supported from the pylon 110 such that the left half panel 302 and right half panel 304 are coupled to the pylon and inner fixed structure 320, 322 at the top of the nacelle by respective hybrid beams 306, 308. A track slider 310, 312 moves in a bracket of each respective beam, as described more fully below. The track slider allows the two half panels to translate aft during the deployment of the thrust reversing apparatus. The track slider may be comprised of two separate track slider assemblies to have sufficient strength to handle the hoop pressure loads on the nacelle panels. A sealant may be added to one or more of the slider tracks to eliminate pressure leaks within the duct. Hinge stations 316, 318 allow the two half panels 302, 304 to pivot outward, enabling access to the engine 114. A latch connection 314 at the bottom of the nacelle holds the two half panels 302, 304 together during normal aircraft operation. The hybrid beams 306, 308 are constructed similarly to each other and, as described more fully below, are constructed of a composite structure with multiple hinge stations that are disposed along the fore-aft length of the beams 306, 308. FIG. 3 also shows lower beams 336 and 338, one for each nacelle half, corresponding to the upper beams 306 and 308, respectively. The lower beams 336, 338 may or may not be of similar hybrid construction as the hybrid beams 306, 308. The lower beams may also have tracks, but with latch assemblies 314 at the frame stations instead of hinge assemblies. The latches 314 hold the two half panels 302, 304 together during normal aircraft operation.

FIG. 4 depicts opposing side views of the composite structure 400 of the hybrid beams 306, 308. The opposing views comprise, for example, respective left side and right sides of the beam, or inner and outer side surfaces, relative to the engine support, of the beam. The composite structure is made up of two longitudinal composite panels 402, 404 of composite material that are integrally affixed to each other along a longitudinal edge 406. FIG. 4 shows there is no adjoining surface that extends from one panel 402 to the other 404. That is, the composite structure forms an open construction that has no contiguous surface between the panels 402, 404 other than the longitudinal edge 406. The composite structure 400 is typically comprised of a fibrous cloth impregnated with a resin, however other materials or metal, or a combination thereof may be used without departing from the invention. The panels may be integrally affixed to each other by myriad methods, for example, welding, gluing or fastening. The panels may also be integrally affixed to each other during the composite lay-up process where contiguous sheets of fibrous cloth may be used to form both panels simultaneously, creating a unitary contiguous beam that is generally "L-shaped" in cross-section. The composite structure may be equipped with one or more reinforcement ribs 408 along its length. The reinforcement ribs may run longitudinally, transverse, or in both directions and be disposed on one or both panels. The ribs may be constructed of composite material or may be constructed of another material and affixed to the structure. The ribbing structure increases the stiffness of the composite structure and helps it to resist deformation under load. The reinforcement ribs may, for example, be L-shaped as shown, or triangular shaped, square shaped, rounded or other shapes without departing from the invention. The composite structure may also be equipped with slots 490 for receiving hinge stations and mounting holes 412 for securing hinge stations to the composite structure.

Figure 5:
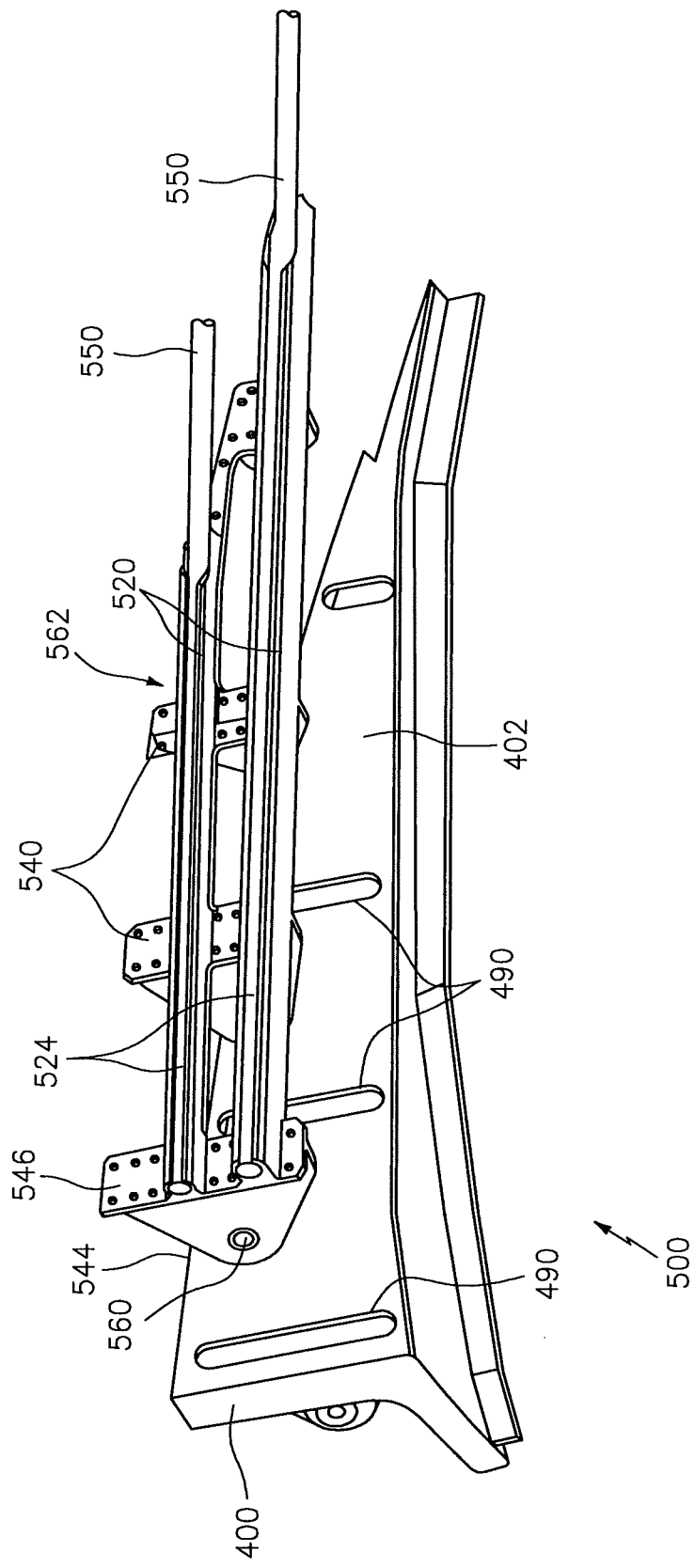
FIG. 5 and FIG. 6 are perspective opposing side views of a hybrid beam constructed with hinge stations in accordance with the embodiments disclosed herein.
Figure 6:
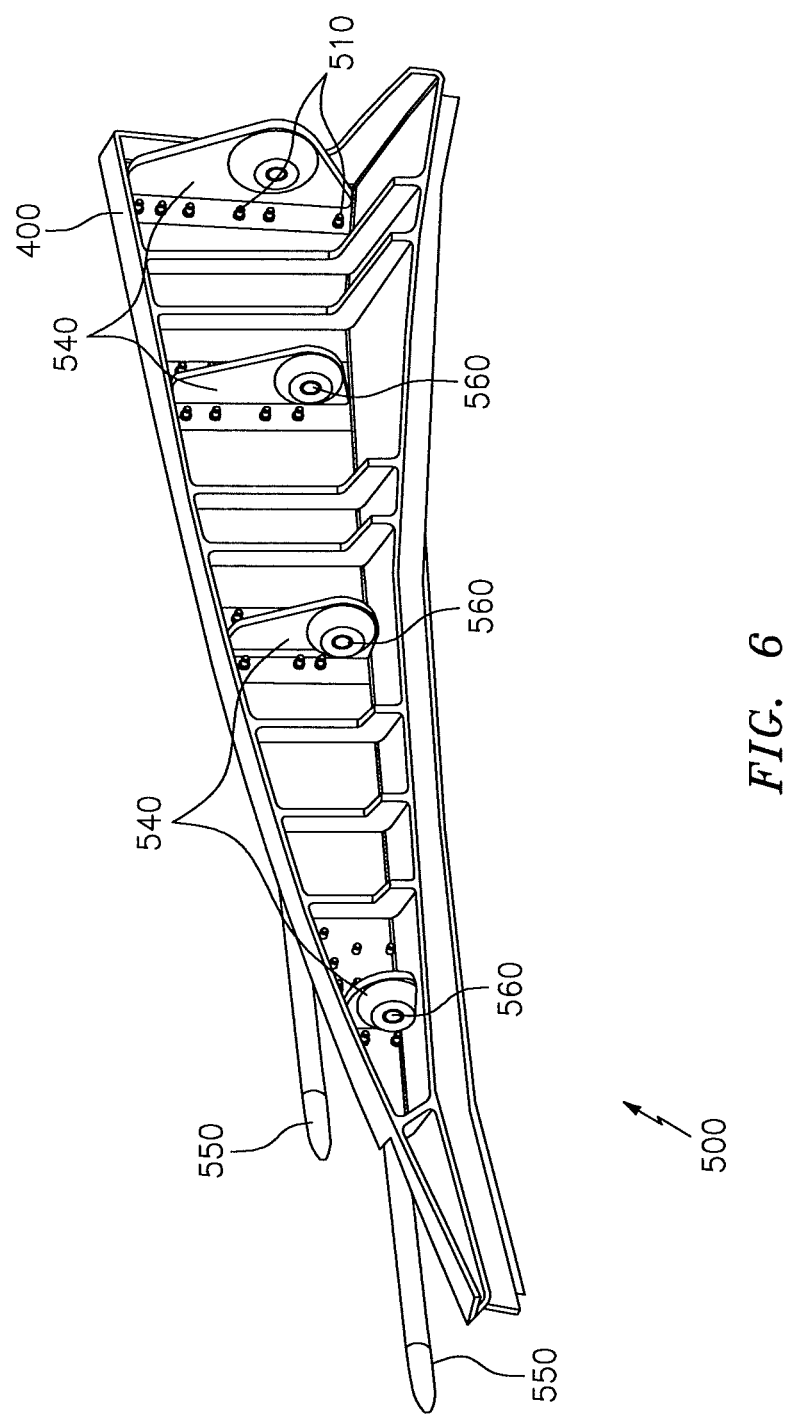

FIG. 5 and FIG. 6 are perspective views of a hybrid beam 500 constructed with the composite structure 400 (FIG. 4) and a plurality of hinge stations 540. FIG. 5 and FIG. 6 show opposite sides of the beam 500, which has a substantially open beam construction, in accordance with the embodiments disclosed herein. A hinge station and track guide assembly 562 is mated with the first composite panel 402. In this embodiment the plurality of hinge stations 540 are integrally affixed to upper and lower track guides 520. The hinge stations may be integrally affixed to the track guides, for example, by welding, gluing or fastening. They may also be integrally affixed by being machined from a contiguous billet of material, resulting in a substantially unitary structure.

In this embodiment, the hinge stations 540 are equipped with at least one pivot plate 544 that is attached to a vertical mounting plate 546. The vertical mounting plates may be equipped to receive fasteners 510. The first composite panel 502 may be equipped with mounting holes 412 (FIG. 4) sized to receive the fasteners 510. The hinge station and track guide assembly is mated with the first composite beam wherein wherein the plurality of hinge stations extends through a corresponding slot 490 of the composite panel 402. That is, after the hinge station and track guide assembly is mated to the composite panel, track guides are disposed on the outside of the first composite panel 402. The hinge and track guide assembly may be affixed to the composite panel with, for example, fasteners, adhesive or welding techniques.

The track guides 520 may receive track guide inserts 524. The track guide inserts are typically employed for the purpose of reducing sliding friction between the sliders 550 and the track guides, a pressure seal for the bypass duct and or for replaceable wear surfaces. The sliders may be provided as integral components of the translating sleeve of the thrust reverser system. Details of the track guides, inserts, and sliders are illustrated in more detail in FIG. 15.

Figure 15:
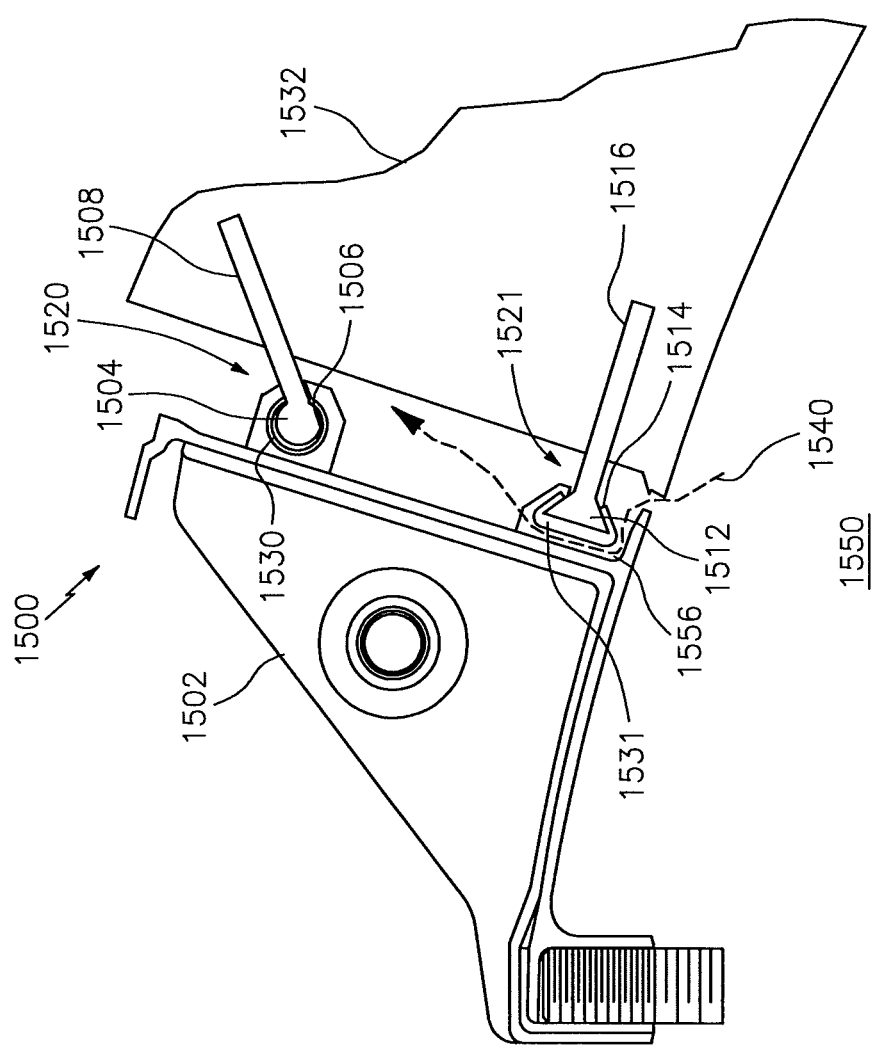
FIG. 15 is a cross-section view of a hybrid beam hinge station and slider apparatus in accordance with the embodiments disclosed herein.

FIG. 15 shows a cross section of a hybrid beam 1500 in the vicinity of a hinge station 1502. This embodiment is equipped with an inner slider 1521 and an outer slider 1520. The outer slider has a head portion 1504 that has a rounded surface 1506, configured to slide within the outer track guide insert 1530. A stem portion 1508 is attached to a nacelle panel 1532 enabling the panel to translate fore and aft. FIG. 15 also depicts a cross-section illustration of an inner slider 1521 also configured to be received in a track guide insert 1531. The inner slider has a triangularly shaped head portion 1512 that has a surface 1514, configured to slide within a track guide insert 1531. A stem portion 1516 is attached to the nacelle panel 1532 enabling the panel to translate fore and aft. The track guide inserts may be comprised of, for example, bronze, oil impregnated bronze, brass, plastic or Teflon. The track guide inserts may be continuous or discontinuous based on the design requirements. For instance, a continuous inner track guide insert may be optimal for a pressure seal and discontinuous outer track guides may be employed for decreased sliding friction. Other constructions of sliders and track guide inserts are readily apparent to those of skill in the art and may be employed without departing from the invention.

The bypass duct 1550 may be pressurized, thus it may be desirable to seal one or more of the slider assemblies to mitigate pressure leaks as shown by path 1540. This may be accomplished by selecting the appropriate track guide insert material 1531 such that a seal is formed between the track guide insert and the slider head 1512. Additionally, it may be beneficial to apply a sealant at location 1556 to seal the track guide and or the track guide insert to the hybrid beam 1500. Other methods of sealing the apparatus may be employed, including adding sealing means to the outer slide, without departing from the invention.

Referring back to FIG. 5, the track guides 520 of the hinge stations transfer loads received from the sliders 550. Each hinge station may also be equipped with one or more bushings 560 defining a center of rotation for the nacelle panel relative to the hybrid beam. That is, each hinge station is rotably attached via the bushings to the engine pylon thereby allowing the two half panels 302, 304 of the nacelle to pivot outward, enabling access to the engine 114. The FIG. 5 and FIG. 6 beam has the same construction as the FIG. 4 beam, so that the beam illustrated in FIGS. 5 and 6 has an open construction that has no contiguous surface between the panels 402, 404 other than the longitudinal edge 406.

As described above with regard to FIG. 15, now referring to FIG. 5, the track inserts 524 in FIG. 5 and FIG. 6 each receive a head portion of a respective slider 550, each of which is fixed to the translating jet engine nacelle panel. The head portion of the slider translates in its respective track guide, sliding along the longitudinal length of the beam 500 facilitating deployment of the thrust reversing apparatus.

FIG. 7 shows front and rear perspective opposing side views of another embodiment of a hybrid beam 700. The composite structure is constructed similarly as described above with reference to FIG. 4, with a first composite panel 702 and a second composite panel 704, so that the beam 700 has an open construction that has no contiguous surface between the side panels 702, 704 other than an adjoining longitudinal edge. FIG. 7 differs, however, in that there are no slots in the composite panel for receiving hinge stations. Instead, a plurality of hinge stations 740 are disposed along the inside surface of the first composite panel 702. In this embodiment, the hinge stations 740 are equipped with two or more pivot plates 744 that are attached to a vertical mounting plate 746 and at least one horizontal mounting plate 747. It will be appreciated that the number of pivot plates can be varied in any of the embodiments without departing from the invention herein. The vertical and horizontal mounting plates may be equipped to receive fasteners 710. The first composite panel 702 may be equipped with mounting holes 712 sized to receive the fasteners 710. One or more track guides 720 may be disposed on the outside surface of the first composite panel 702. In this embodiment, the track guides are substantially continuous along the length of the composite structure and are integrally affixed to each other. They may be integrally affixed by, for example, fasteners, welding, adhesive, or by being machined from a contiguous billet of material. Fasteners may be used to secure the hinge stations to the track guides, thus sandwiching the composite panel 702 between the hinge stations and the track guides. Fasteners may also be used to fasten the hinge stations to the second composite panel 704. Alternatively, the hinge stations and the track guides may be attached to the composite structure with other means, for example, adhesive or welding.

The track guides 720 may receive track guide inserts 724 and sliders 750 as disclosed above with reference to FIGS. 5, 6 and 15. The insert 724 is shown partially inserted. The sliders may be provided as integral components of the translating sleeve of the thrust reverser system. Each hinge station may also be equipped with one or more bushings 760 defining a center of rotation for the nacelle panel relative to the hybrid beam. That is, each hinge station is rotably attached via the bushings to the engine pylon thereby allowing the two half panels 302, 304 of the nacelle to pivot outward, enabling access to the engine 114.

FIG. 8 shows perspective opposing side views of another embodiment of a hybrid beam 800. This embodiment is similar to the previous FIG. 7 embodiment, however each hinge station 840 is equipped with one pivot plate 844 instead of two pivot plates. The beam and pylon structure engage each other to provide the hinge connection disclosed herein. Those skilled in the art will appreciate that, in general, either the beam or the pylon structure will be provided with two hinge plates (pairs of pivot plates or hinge stations), and the other structure will be provided with single pivot plates such that the single plate is received between the paired hinge plates of the other structure. The composite structure is constructed similarly as described above with reference to FIG. 4, in that FIG. 8 has two contiguous composite panels 802, 804 adjoined with an open construction, however, there are no slots in either composite panel for receiving hinge. A plurality of hinge stations 840 are disposed along the inside surface of the first composite panel 802. In this embodiment, the hinge stations 840 are equipped with one pivot plate 844 that is attached to a vertical mounting plate 846 and at least one horizontal mounting plate 847. It will be appreciated that the number of pivot plates can be varied in any of the embodiments without departing from the invention herein. The mounting plates may be equipped to receive fasteners 810. The vertical panel may be equipped with mounting holes 812 sized to receive the fasteners 810. Track guides 820 may be disposed on the outside surface of the composite panel. Fasteners may be used to secure the hinge stations to the track guide, thus sandwiching the composite panel 802 between the hinge stations and the track guide. Fasteners may also be used to fasten the hinge stations to the second composite panel 804. Alternatively, the hinge stations and the track guides may be attached to the composite structure with other means, for example, adhesive or welding.

The track guides 820 may receive track guide inserts 824 and sliders 850 as disclosed above with reference to FIGS. 5, 6 and 15. The sliders may be provided as integral components of the translating sleeve of the thrust reverser system. Each hinge station may also be equipped with one or more bushings 860 defining a center of rotation for the nacelle panel relative to the hybrid beam. That is, each hinge station is rotably attached via the bushings to the engine pylon thereby allowing the two half panels 302, 304 of the nacelle to pivot outward, enabling access to the engine 114.

Figure 9A:
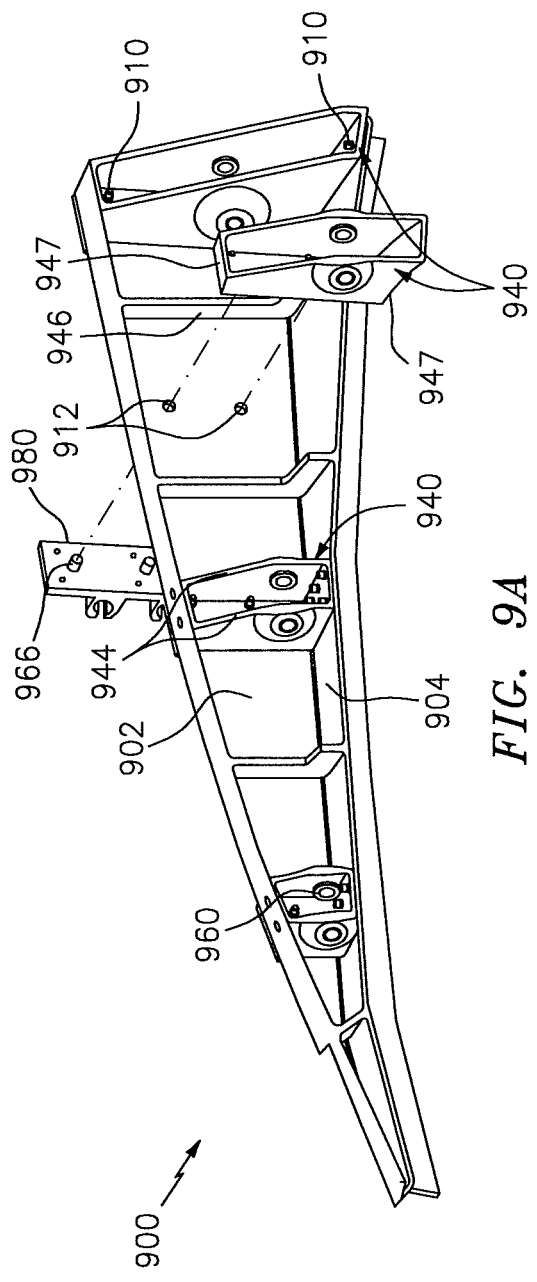
FIGS. 9A and 9B show perspective opposing side views of a hybrid beam constructed with hinge stations in accordance with the embodiments disclosed herein.
Figure 9B:
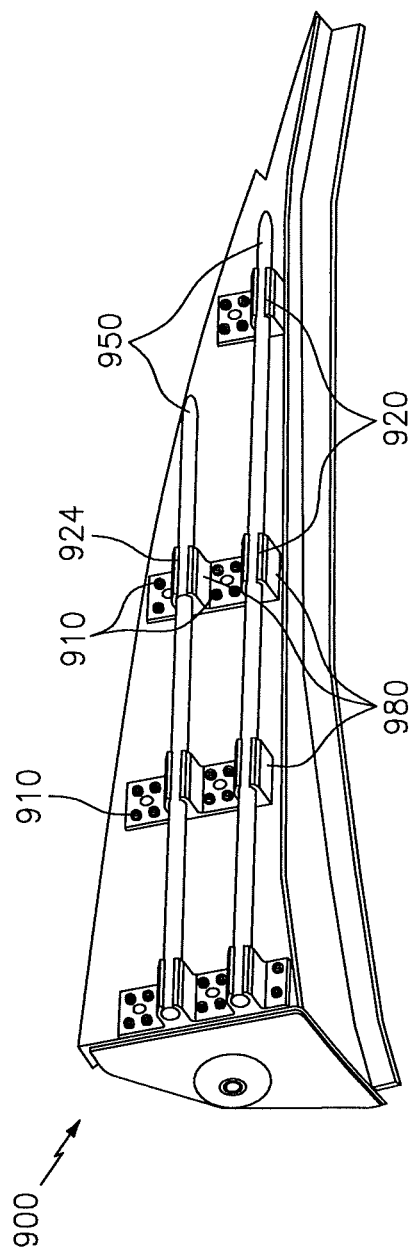

FIG. 9 shows perspective opposing side views of another embodiment of a hybrid beam 900. This embodiment is similar to the previous embodiments, however there are now a plurality of individual track guide plates 980 corresponding to each hinge station. The composite structure is constructed similarly as described above with reference to FIG. 4, in that FIG. 9 has two contiguous composite panels 902 904 adjoined with an open construction, however, there are no slots in the composite panel for receiving hinge stations in this embodiment. A plurality of hinge stations 940 are disposed along the inside surface of the first composite panel 902. In this embodiment, the hinge stations 940 are equipped with two or more pivot plates 944 that are attached to a vertical mounting plate 946 and at least one horizontal mounting plate 947. It will be appreciated that the number of pivot plates can be varied in any of the embodiments without departing from the invention herein. The mounting plates may be equipped to receive fasteners 910. The first composite panel 902 may be equipped with mounting holes 912 sized to receive the fasteners 910. Individual track guide plates 980 may be disposed on the outside surface of the first composite panel. Fasteners may be used to secure the hinge stations to the track guide plates, thus sandwiching the first composite panel 902 between the hinge stations and the track guide plates. Fasteners may also be used to fasten the hinge stations to the second composite panel 904. Alternatively, the hinge stations and the track guides may be attached to the composite structure with other means, for example, adhesive or welding.

One or more of the track guide plates may be equipped with one or more track guides 920. Thus, the track guides in this embodiment may be substantially discontinuous along the beam. The track guides 920 may receive track guide inserts 924 and sliders 950 as disclosed above with reference to FIGS. 5, 6 and 15. In this embodiment the track guide inserts may be substantially discontinuous, similar to the track guide plates, or they may be substantially continuous, spanning two or more track guide plates. Further, one or more of the track guide plates may be equipped with one or more alignment pins 966 facilitating alignment with its corresponding hinge station. Each hinge station may also be equipped with one or more bushings 960 defining a center of rotation for the nacelle panel relative to the hybrid beam. That is, each hinge station is rotably attached via the bushings to the engine pylon thereby allowing the two half panels 302, 304 of the nacelle to pivot outward, enabling access to the engine 114.

Figure 10:
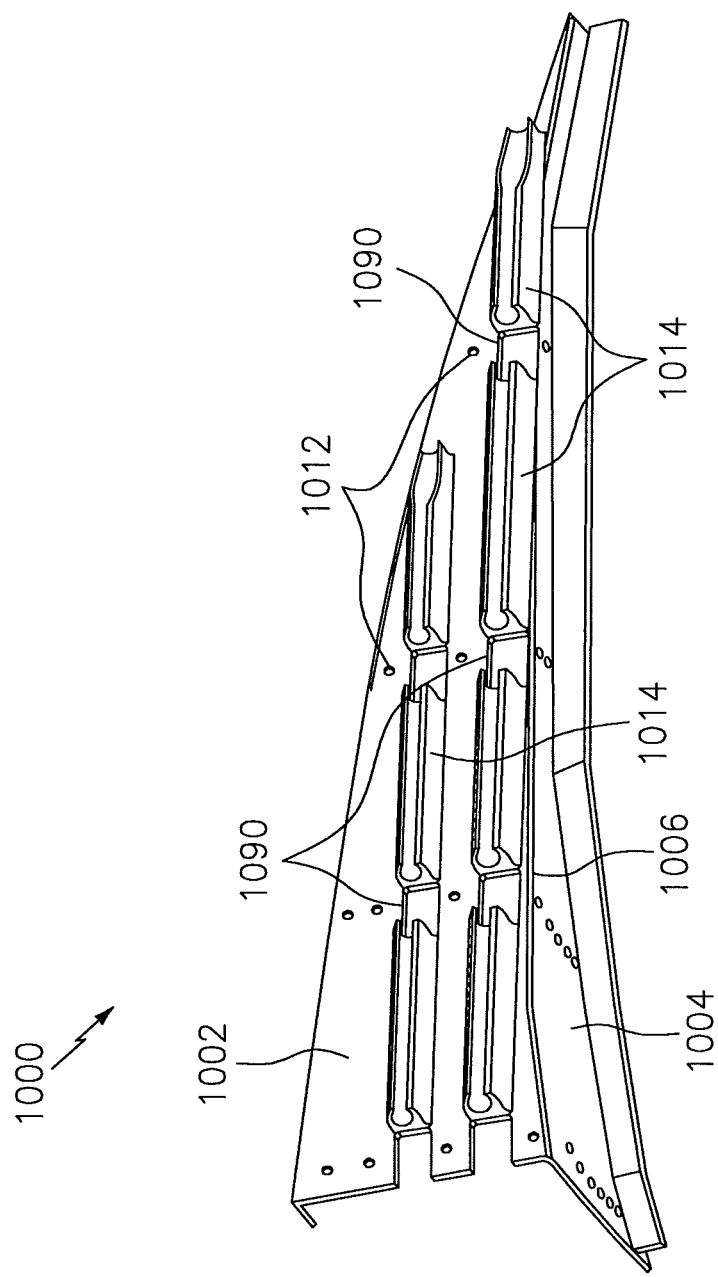
FIG. 10 shows a perspective view of a composite beam in accordance with the embodiments disclosed herein.

FIG. 10 depicts a perspective view of another embodiment of the composite structure 1000 of the hybrid beams 306, 308. The composite structure is made up of two longitudinal composite panels 1002, 1004 of composite material that are integrally affixed to each other along a longitudinal edge 1006, and there is no adjoining surface that extends from one panel 1002 to the other 1004. The panels may be integrally affixed to each other by myriad methods, for example, welding, gluing or fastening. The panels may also be integrally affixed to each other during the composite lay-up process where contiguous sheets of fibrous cloth may be used to form both panels simultaneously, creating a unitary contiguous beam that is generally "L-shaped" in cross-section. The composite structure may be equipped with one or more reinforcement ribs 408 (FIG. 4). The reinforcement ribs may run longitudinally, transverse, or in both directions and be disposed on one or both panels. The ribs may be constructed of composite material or may be constructed of another material and affixed to the structure. The ribbing structure increases the stiffness of the composite structure and helps it to resist deformation under load. The reinforcement ribs may, for example, be L-shaped as shown, or triangular shaped, square shaped, rounded or other shapes without departing from the invention. The composite structure may also be equipped with slots 1090 for receiving hinge stations and mounting holes 1012 for securing hinge stations to the composite structure.

The composite structure may also be equipped with no-load track segments 1014 disposed between the hinge stations. The no-load track segments may be comprised of composite material similar to the composite panels, or may be composed of alternate materials, for example, plastic or metal.

FIG. 11 shows perspective opposing side views of a hybrid beam 1100 constructed with the composite structure 1000 (FIG. 10) and a plurality of hinge stations 1140. The beam has a substantially open beam construction, in accordance with the embodiments disclosed herein. In this embodiment the plurality of hinge stations 1140 may be integrally affixed to at least one or more track guides 1120. The hinge stations may be integrally affixed to the track guides, for example, by welding, gluing or fastening. They may also be integrally affixed by being machined from a contiguous billet of material, resulting in a substantially unitary structure.

The plurality of hinge stations 1140 are disposed along the inside surface of the first composite panel 1102 wherein the one or more integrally affixed track guides extends through a corresponding slot 1190 of the first composite panel 1102. That is that after each hinge station is mated to the composite panel, the one or more integrally affixed track guides for that station are disposed on the outside of the composite panel 1102. In this embodiment, the hinge stations 1140 may be equipped with two or more pivot plates 1144 that are attached to a vertical mounting plate 1146 and at least one horizontal mounting plate 1147. It will be appreciated that the number of pivot plates can be varied in any of the embodiments without departing from the invention herein. The mounting plates may be equipped to receive fasteners 1110. The first composite panel 1102 may be equipped with mounting holes 1112 sized to receive the fasteners 1110. Fasteners may be used to secure the hinge stations to the composite panel 1102. Fasteners may also be used to fasten the hinge stations to the second composite panel 1104. Alternatively, the hinge stations and the track guides may be attached to the composite structure 1000 with other means, for example, adhesive or welding.

The integrally affixed track guides 1120 generally align with the no-load track segments 1014 disposed on the composite structure 1000. Thus, the track guides in this embodiment may be substantially discontinuous and may be comprised of integrally affixed track guides 1120 and no-load track segments 1014. The track guides 1014, 1120 may receive track guide inserts 1124 and sliders 1150 as disclosed above with reference to FIGS. 5, 6 and 15. In this embodiment the track guide inserts may be substantially discontinuous, or they may be substantially continuous. Track guides inserts may, for example, only be placed in the no-load track segments, only be placed in the integrally affixed track guides, or may be substantially unitary, spanning across multiple integrally affixed track guides. Other configurations of track guide liners are readily apparent to one of skill in the art and may be employed without departing from the invention. The integrally affixed track guides carry the primary load from the sliders 1150 to the hinge stations. Each hinge station may also be equipped with one or more bushings 1160 defining a center of rotation for the nacelle panel relative to the hybrid beam. That is, each hinge station is rotably attached via the bushings to the engine pylon thereby allowing the two half panels 302, 304 of the nacelle to pivot outward, enabling access to the engine 114.

FIG. 12 shows perspective opposing side views of a hybrid beam 1200 constructed with a composite structure and a plurality of hinge stations 1240. The beam has a substantially open beam construction, in accordance with the embodiments disclosed herein. The composite structure is made up of two longitudinal composite panels 1202, 1204 of composite material that are integrally affixed to each other along a longitudinal edge 1206. The composite structure is typically comprised of a fibrous cloth impregnated with a resin, however other materials or metal, or a combination thereof may be used without departing from the invention. The panels may be integrally affixed to each other by myriad methods, for example, welding, gluing or fastening. The panels may also be integrally affixed to each other during the composite lay-up process where contiguous sheets of fibrous cloth may be used to form both panels simultaneously, creating a unitary contiguous beam that is generally "L-shaped" in cross-section. The composite structure may be equipped with one or more reinforcement ribs 1208. The reinforcement ribs may run longitudinally, transverse, or in both directions and be disposed on one or both panels. The ribs may be constructed of composite material or may be constructed of another material and affixed to the structure. The ribbing structure increases the stiffness of the composite structure and helps it to resist deformation under load. The reinforcement ribs may, for example, be L-shaped as shown, or triangular shaped, square shaped, rounded or other shapes without departing from the invention.

The composite structure may also be equipped with one or more hinge stations 1240. Each hinge station may be equipped with one or more pivot plates 1244. The pivot plates may be integrally formed into the composite panels 1102, 1104 or may be separate components secured to the panels with, for example, welding, fasteners or adhesive. It will be appreciated that the number of pivot plates can be varied in any of the embodiments without departing from the invention herein. One or more integral track guides 1220 may be disposed on the outside of the first composite panel 1202. The integral track guides may be integrally molded into the composite wall, or may be fastened to the wall with, for example, by welding, fasteners or adhesive. Each track guide may be equipped with a track guide liner 1296 comprised of, for example, titanium, aluminum, steel or plastic. The track guide liners may be integrally molded into the first composite panel 1202 or may be inserted after the panel is manufactured. The track guides 1220 or track guide liners 1296 may receive track guide inserts 1224 and sliders 1250 as disclosed above with reference to FIGS. 5, 6 and 15. The sliders may be provided as integral components of the translating sleeve of the thrust reverser system. Each hinge station may also be equipped with one or more bushings 1260 defining a center of rotation for the nacelle panel relative to the hybrid beam. That is, each hinge station is rotably attached via the bushings to the engine pylon thereby allowing the two half panels 302, 304 of the nacelle to pivot outward, enabling access to the engine 114.

FIG. 13 shows perspective opposing side views of a hybrid beam 1300 constructed with a composite structure and a plurality of hinge stations 1340. The beam has a substantially open beam construction, in accordance with the embodiments disclosed herein. The composite structure is made up of two longitudinal composite panels 1302, 1304 of composite material that are integrally affixed to each other along a longitudinal edge 1306. The composite structure is typically comprised of a fibrous cloth impregnated with a resin, however other materials or metal, or a combination thereof may be used without departing from the invention. The panels may be integrally affixed to each other by myriad methods, for example, welding, gluing or fastening. The panels may also be integrally affixed to each other during the composite lay-up process where contiguous sheets of fibrous cloth may be used to form both panels simultaneously, creating a unitary contiguous beam that is generally "L-shaped" in cross-section. The composite structure may be equipped with one or more reinforcement ribs 1308. The reinforcement ribs may run longitudinally, transverse, or in both directions and be disposed on one or both panels. The ribs may be constructed of composite material or may be constructed of another material and affixed to the structure. The ribbing structure increases the stiffness of the composite structure and helps it to resist deformation under load. The reinforcement ribs may, for example, be L-shaped as shown, or triangular shaped, square shaped, rounded or other shapes without departing from the invention.

The composite structure may also be equipped with one or more hinge stations 1340. Each hinge station may be equipped with two or more pivot plates 1344. The pivot plates may be integrally formed into the composite panels 1302, 1304 or may be separate components secured to the panels with, for example, welding, fasteners or adhesive. It will be appreciated that the number of pivot plates can be varied in any of the embodiments without departing from the invention herein. One or more integral track guides 1320 may be disposed on the outside of the first composite panel 1302. The integral track guides may be integrally molded into the composite wall, or may be fastened to the wall with, for example, by welding, fasteners or adhesive. Each track guide may be equipped with a track guide liner 1396 comprised of, for example, titanium, aluminum, steel or plastic. The track guide liners may be integrally molded into the first composite panel 1302 or may be inserted after the panel is manufactured. The track guides 1320 or track guide liners 1396 may receive track guide inserts 1324 and sliders 1350 as disclosed above with reference to FIGS. 5, 6 and 15. The sliders may be provided as integral components of the translating sleeve of the thrust reverser system. Each hinge station may also be equipped with one or more bushings 1360 defining a center of rotation for the nacelle panel relative to the hybrid beam. That is, each hinge station is rotably attached via the bushings to the engine pylon thereby allowing the two half panels 302, 304 of the nacelle to pivot outward, enabling access to the engine 114.

Figure 14A:
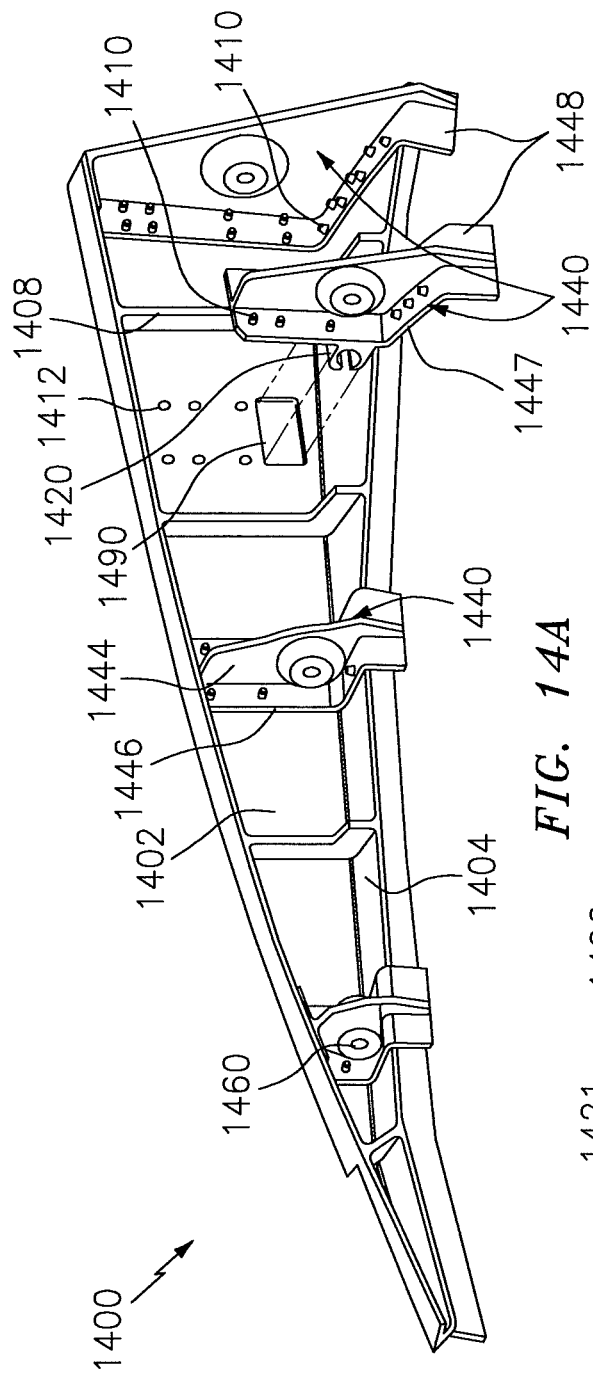
FIGS. 14A and 14B show perspective opposing side views of a hybrid beam constructed with hinge stations in accordance with the embodiments disclosed herein.
Figure 14B:
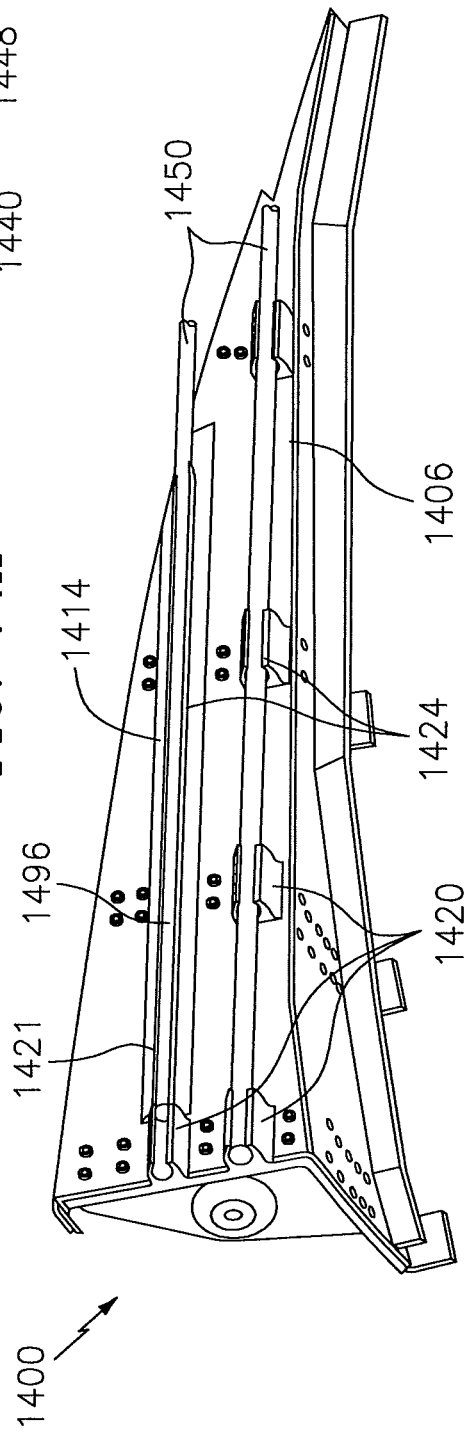

FIG. 14 shows perspective opposing side views of a hybrid beam 1400 constructed with a composite structure and a plurality of hinge stations 1440. The beam has a substantially open beam construction, in accordance with the embodiments disclosed herein. The composite structure is made up of two longitudinal composite panels 1402, 1404 of composite material that are integrally affixed to each other along a longitudinal edge 1406. The composite structure is typically comprised of a fibrous cloth impregnated with a resin, however other materials or metal, or a combination thereof may be used without departing from the invention. The panels may be integrally affixed to each other by myriad methods, for example, welding, gluing or fastening. The panels may also be integrally affixed to each other during the composite lay-up process where contiguous sheets of fibrous cloth may be used to form both panels simultaneously, creating a unitary contiguous beam that is generally "L-shaped" in cross-section. The composite structure may be equipped with one or more reinforcement ribs 1408. The reinforcement ribs may run longitudinally, transverse, or in both directions and be disposed on one or both panels. The ribs may be constructed of composite material or may be constructed of another material and affixed to the structure. The ribbing structure increases the stiffness of the composite structure and helps it to resist deformation under load. The reinforcement ribs may, for example, be L-shaped as shown, or triangular shaped, square shaped, rounded or other shapes without departing from the invention.

One or more integral track guides 1421 may be disposed on the outside of the first composite panel 1402. The integral track guides may be integrally molded into the composite wall, or may be fastened to the wall with, for example, by welding, fasteners or adhesive. Each integral track guide may be equipped with a track guide liner 1496 comprised of, for example, titanium, aluminum, steel or plastic. The track guide liners may be integrally molded into the first composite panel 1402 or may be inserted after the panel is manufactured.

A plurality of hinge stations 1440 may be disposed along the inside surface of the first composite panel 1402 wherein the one or more integrally affixed track guides 1420 extends through a corresponding slot 1490 of the composite panel 1402. That is after each hinge station is mated to the composite panel, the one or more integrally affixed track guides for that hinge station are disposed on the outside of the composite panel 1402. The hinge stations may be integrally affixed to the track guides, for example, by welding, gluing or fastening. They may also be integrally affixed by being machined from a contiguous billet of material, resulting in a substantially unitary structure.

In this embodiment, the hinge stations 1440 may be equipped with one or more pivot plates 1444 that are attached to a vertical mounting plate 1446 and at least one horizontal mounting plate 1447. It will be appreciated that the number of pivot plates can be varied in any of the embodiments without departing from the invention herein. The mounting plates may be equipped to receive fasteners 1410. The first composite panel 1402 may be equipped with mounting holes 1412 sized to receive the fasteners 1410. Fasteners may be used to secure the hinge stations to the first composite panel 1402. Fasteners may also be used to fasten the hinge stations to the second composite panel 1404. Alternatively, the hinge stations and the track guides may be attached to the composite structure with other means, for example, adhesive or welding. Hinge stations may also be equipped with a mounting lip 1448 for securing the hybrid beam to the inner fixed structure 320, 322 (FIG. 3). The mounting lip may be employed on any configuration of hinge station.

The integrally affixed track guides 1420 on the hinge stations generally align with the integral track guides 1414 disposed on the composite structure 1400. Thus, the track guides in this embodiment may be substantially discontinuous and may be comprised of a combination of integrally affixed track guides 1420 and integral track guides 1414. The track guides 1414, 1420 may receive track guide inserts 1424 and sliders 1450 as disclosed above with reference to FIGS. 5 and 6. The sliders may be provided as integral components of the translating sleeve of the thrust reverser system. In this embodiment, the track guide inserts may be substantially discontinuous, or they may be substantially continuous. Track guide inserts may, for example, only be placed in the integral track guides, only be placed in the integrally affixed track guides, or may be substantially unitary, spanning across integral track guides and integrally affixed track guides. Other configurations of track guide liners are readily apparent to one of skill in the art and may be employed without departing from the invention. Each hinge station may also be equipped with one or more bushings 1460 defining a center of rotation for the nacelle panel relative to the hybrid beam. That is, each hinge station is rotably attached via the bushings to the engine pylon thereby allowing the two half panels 302, 304 of the nacelle to pivot outward, enabling access to the engine 114.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An apparatus for support of a nacelle panel of a jet engine, the apparatus comprising:
    a beam comprising a first longitudinal composite panel and a second longitudinal composite panel, wherein the first longitudinal composite panel is integrally formed with the second longitudinal composite panel along a longitudinal edge in an open construction;
    a plurality of hinge stations mounted to the beam and disposed on a first side of the first longitudinal composite panel; and
    at least one track guide disposed on a second side of the first longitudinal composite panel, wherein the track guide is integrally formed with a first of the hinge stations.

2. An apparatus for support of a nacelle panel of a jet engine, the apparatus comprising:
    a beam comprising a first longitudinal composite panel and a second longitudinal composite panel, wherein the first longitudinal composite panel is integrally formed with the second longitudinal composite panel along a longitudinal edge in an open construction;
    a plurality of hinge stations mounted to the beam and disposed on a first side of the first longitudinal composite panel; and
    at least one track guide disposed on a second side of the first longitudinal composite panel, wherein the track guide is attached to a first of the hinge stations by a plurality of fasteners.

3. An apparatus for support of a nacelle panel of a jet engine, the apparatus comprising:
    a composite beam comprising a first longitudinal composite panel and a second longitudinal composite panel, wherein the first longitudinal composite panel is integrally forming with the second longitudinal composite panel along a longitudinal edge in an open construction;
    a plurality of hinge stations mounted to the beam and disposed on a first side of the first longitudinal composite panel; and
    a monolithic metallic track guide structure disposed on a second side of the first longitudinal composite panel which is opposite of the first side, wherein track guide structure includes a first track guide, a second track guide and one or more web elements which extend between and connect the first and the second track guides, and wherein the track guide structure is fixedly attached to a first of the hinge stations.

4. The apparatus of claim 3, wherein the track guide structure is formed integral with the first of the hinge stations.

5. The apparatus of claim 3, wherein the track guide structure is attached to the first of the hinge stations by a plurality of fasteners.

6. The apparatus of claim 3, wherein the first track guide is configured to receive a slider such that the slider is operable to slide axially within a channel of the first track guide.

* * * * *